June 24, 1924.
G. R. GREENSLADE ET AL
1,499,172
DEVICE FOR ELECTRICALLY WELDING SLEEVES TO PLATES
Filed Dec. 15, 1922     2 Sheets-Sheet 1
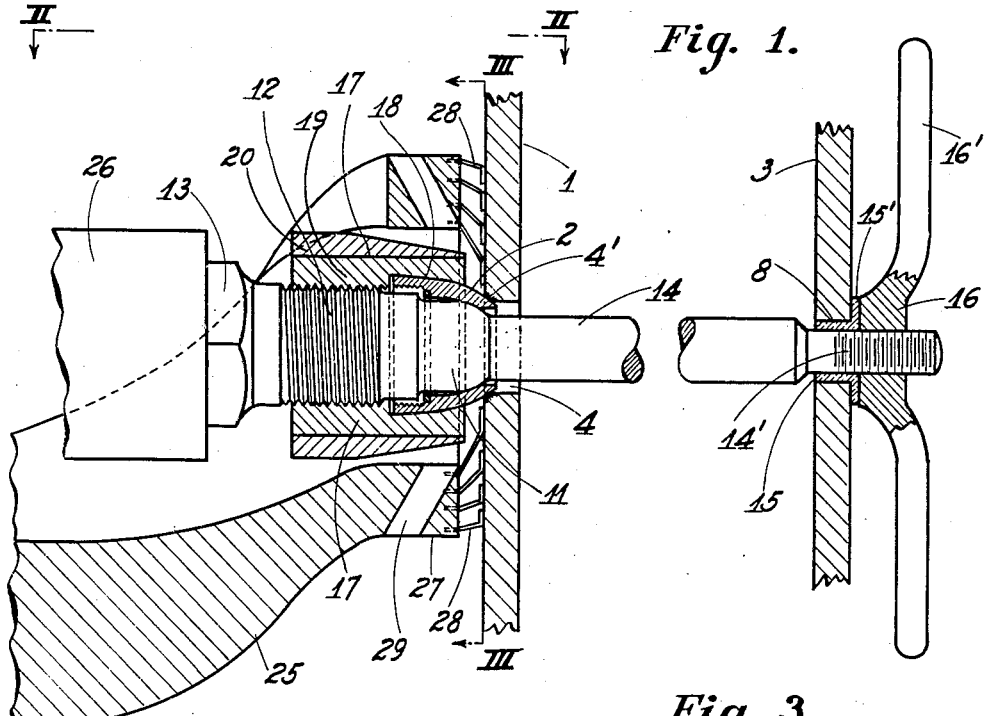
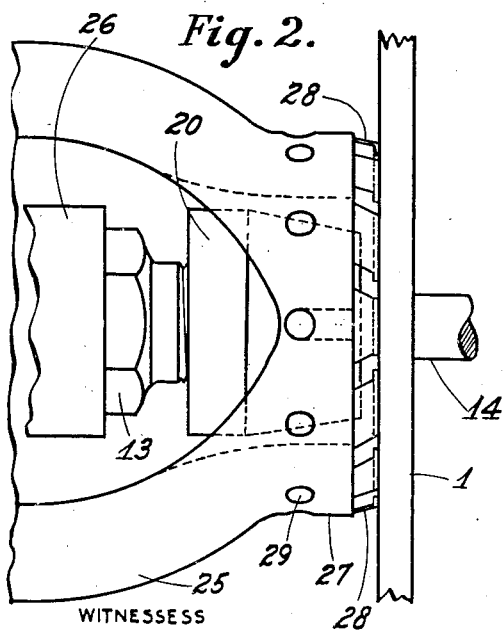
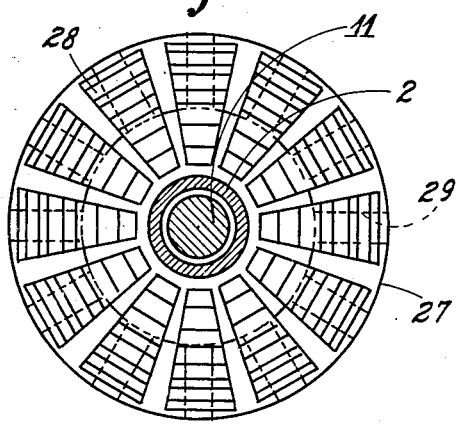
WITNESSES
A. B. Wallace
C. R. Halbert
INVENTORS
Grover R. Greenslade
and
BY Eugene G. Flannery
Winter & Brown
ATTORNEYS June 24, 1924.
G. R. GREENSLADE ET AL
1,499,172
DEVICE FOR ELECTRICALLY WELDING SLEEVES TO PLATES
Filed Dec. 15, 1922   2 Sheets-Sheet 2
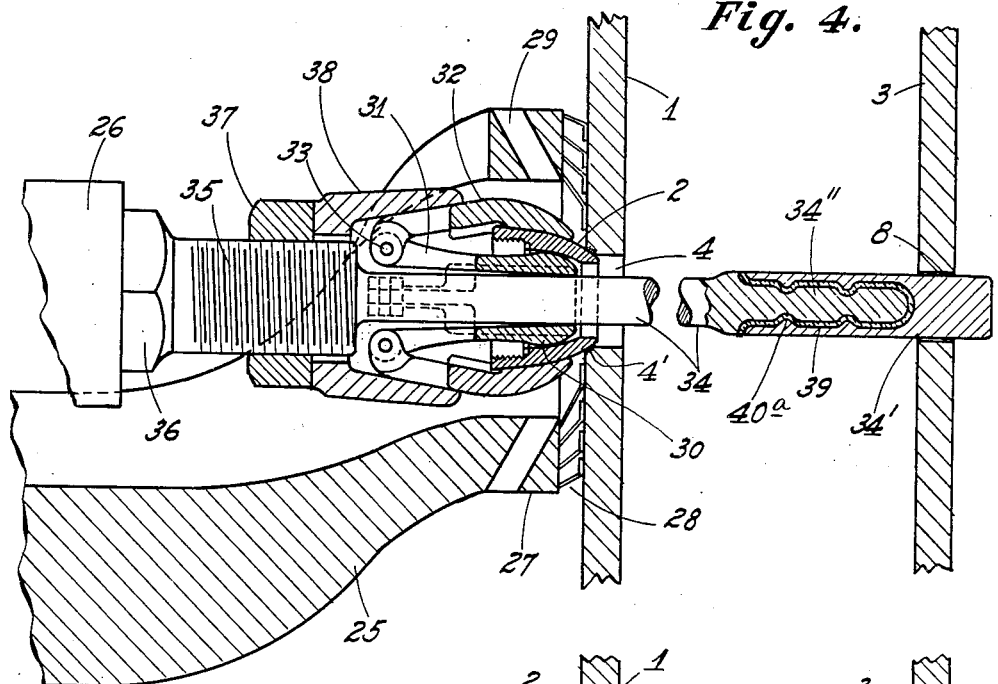
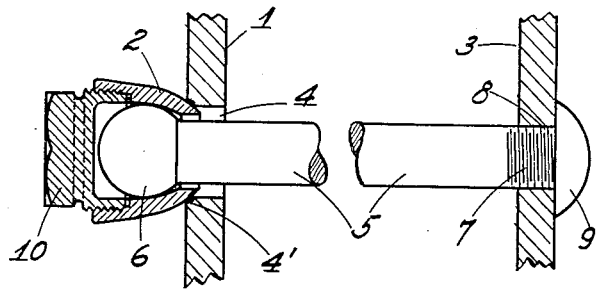
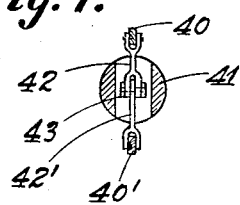
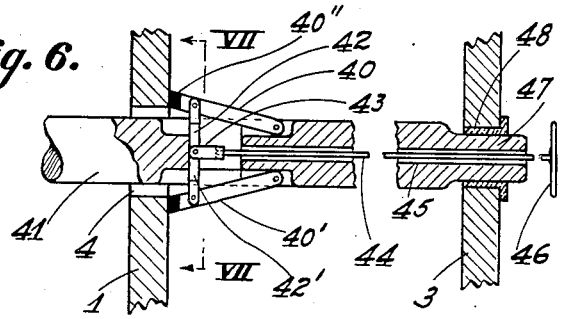
WITNESSES
INVENTORS
Grover R. Greenslade
and
BY Eugene G. Flannery
ATTORNEYS Patented June 24, 1924.

1,499,172

UNITED STATES PATENT OFFICE.

GROVER R. GREENSLADE AND EUGENE G. FLANNERY, OF PITTSBURGH, PENNSYLVANIA, ASSIGNORS TO FLANNERY BOLT COMPANY, OF PITTSBURGH, PENNSYLVANIA, A CORPORATION OF DELAWARE.

DEVICE FOR ELECTRICALLY WELDING SLEEVES TO PLATES.

Application filed December 15, 1922. Serial No. 607,064.

*To all whom it may concern:*

Be it known that we, GROVER R. GREENSLADE and EUGENE G. FLANNERY, citizens of the United States, and residents of Pittsburgh, in the county of Allegheny and State of Pennsylvania, have invented a new and useful Improvement in Devices for Electrically Welding Sleeves to Plates, of which the following is a specification.

This invention relates to a welding apparatus and particularly to one adapted for electrically welding sleeves to plates.

It is an object of the invention to provide a device of the character referred to which is simple and durable in construction, easy to operate, which will not easily get out of order, and which can be readily placed into and removed from an operative position.

It is a special object to provide a welding apparatus which during the application thereof to operative position will at the same time automatically position the sleeve in the desired angular relation with respect to the plate to which it is to be welded, and which will maintain the desired angularity throughout the welding operation, it being also a special object to provide a device which will automatically assure the proper setting of the sleeve regardless of the relative disposition of the apertures through which the bolt to be subsequently used in connection with the welded sleeve must extend.

It is still a further special object to provide a welding apparatus which will not only hold the sleeve in firm contact with the plate during the initial steps of the welding operation, but one capable of exerting a constant and regulated pressure between the sleeve and plate throughout the entire process.

An additional special object is the provision of an apparatus in which the parts for conducting the current used will automatically adjust and maintain themselves in proper position for making good electrical contact with the parts against which they abut, and which will assure ample supply of current to the entire line of contact between the sleeve and plate.

It is also a special object to provide a construction in which the line of weld between the sleeve and plate may be readily observed by the operator during the welding process and in which the danger of short circuiting the electrical supply, when the apparatus is used in connection with spaced plates, is reduced to the minimum.

These and other objects of the invention will more readily appear when taken in connection with the following description and the appended claims.

In the accompanying drawings, Fig. 1 is a fragmentary view, partially in section, and partially in elevation, showing one form of the invention with the parts assembled and in position for welding; Fig. 2 a fragmentary view of the device illustrated in Fig. 1 looking in the direction of the arrows II—II, Fig. 1; Fig. 3 a vertical sectional view taken on the line III—III, Fig. 1; Fig. 4 a view similar to Fig. 1, illustrating a modified form of invention; Fig. 5 a fragmentary detailed view showing the sleeve after being welded to the plate and its use in connection with a flexible bolt connecting two spaced apart plates; Fig. 6 a fragmentary detailed view showing a modified form of the extension used for setting the angularity of the sleeve with relation to the plate, equipped with means for preventing longitudinal movement of the extension; and Fig. 7 a transverse sectional view taken on the line VII—VII of Fig. 6.

In the drawing, 1 designates the plate to which the sleeve 2 is to be welded, and 3 a similar plate spaced from the plate 1 as is common in boiler constructions. It is usual in such work to weld the sleeve 2 within an aperture 4 in the exterior or outer plate 1 and connect the plates 1 and 3 by means of a so-called flexible bolt, such as illustrated in Fig. 5 of the drawings. The form of bolt illustrated comprises the shank or body portion 5, and the rounded head 6. The extremity of the shank 5 opposite the head 6 is customarily threaded, as indicated at 7, for engagement with a threaded aperture 8 provided in the plate 3. In assembling, the threaded portion 7 is engaged with the aperture 8 and extends a slight distance beyond the plate, the protruding metal being upset or riveted as at 9. The head 6 fits within and bears against the internal surface of the sleeve 2 in which it may swivel to compensate for any change in the relative dispositions of the plates 1 and 3, and in order to seal the open end of the sleeve, the same is provided with a closure plug 10.

The present invention deals with an apparatus for welding sleeves 2 within apertures of plates, and since it is primarily designed for sleeves intended to be used with flexible bolts such as noted above, will be described in connection with the spaced apart plates 1 and 3. It is to be understood, however, that the invention is capable of use in many other relations, and is adapted for use generally wherever it is desired to electrically weld forms similar to the sleeve 2 within apertures of plates.

Referring to the form of the invention illustrated in Figs. 1 to 3, 11 designates a plug having a main body portion which is shaped so as to fit within the interior of the sleeve 2, the outer portion being threaded as shown at 12 and at its extreme outer end is formed as a contact head 13 which is non-circular in cross section and adapted for the application of a wrench or other similar tool. Forming an extension of the plug 11 and projecting inwardly therefrom is a rod 14, the extreme inner portion of the rod being reduced as at 14' and externally threaded. The length of the rod 14 is sufficient to bridge the space between the plates 1 and 3, with the reduced portion 14'' fitting within the aperture 8 of the inner plate 3. It is also noted that the cross sectional area of the reduced portion 14' is slightly less than that of the aperture 8 so as to provide a space therebetween for the insertion of an insulated bushing 15, the said bushing having a flanged portion 15' contacting the inner surface of the plate 3 immediately surrounding the aperture 8. The threaded portion 14' is adapted to cooperate with a wing nut 16 provided with the wings 16' for a purpose to be subsequently described.

Embracing the exterior surface of the sleeve 2 are a plurality of segmental members 17 having their inner portions 18 cored out so as to substantially conform to the exterior contour of the sleeve 2 while their outer portions 19 are internally threaded for engagement with the externally threaded portion 12 of the plug. Any number of these segmental embracing members 17 may be employed, preferably four in number. When in assembled operative relation, the exterior surface formed by the members 17 is cylindrical in shape, and the several parts are adapted to be held so assembled by means of an annular sleeve 20 freely slidable over the exterior surface of the members 17.

The method of assembling the parts so far described is as follows—The sleeve 2 is embraced by arranging the several members 17 around the exterior thereof, the sleeve fitting into the cored out portions 18. After the members 17 have been arranged in proper relation to each other the annulus 20 is slid upon the external cylindrical surface formed thereby. The plug 11 is then screwed into the threaded recess formed by the members 17, until the body portion of the plug is brought into firm contact with the interior surface of the sleeve. The entire unit thus formed by the annulus 20, the members 17 and sleeve 2 is then ready for application to the plates 1 and 3. The extension 14 is projected through the aperture 4 with the reduced portion 14' projecting through the aperture 8, after which the insulating bushing 15 is inserted in place and the wing nut 16 applied bringing the various parts into the position shown in Fig. 1, with the sleeve 2 bearing against the previously reamed out portion 4' of the aperture 4. By projecting the extension 14 not only through the aperture 4 but also through the aperture 8 of the plate 3, the sleeve will be angularly set in the aperture 4 in proper position for cooperation with the flexible bolt 5 when subsequently applied. It is well known that the apertures 4 and 8 in the respective plates are not always in strict alignment with each other, and for this reason the automatic angular setting of the sleeve in proper position regardless of the relative dispositions of the openings in the plates is of great practical importance.

The means for supplying current for the welding operation consists of two conductors which customarily lead from and form the terminals of the secondary windings of a suitable transformer, one of such conductors forming the electrode 25 and the other the electrode 26. The electrode 26 is adapted to contact the head 13 of the plug 11 while the electrode 25 is adapted to supply current to the plate 1 in the region surrounding the line of weld between the sleeve and plate. The terminal of the electrode 25 is annular in form as indicated at 27 having an internal bore sufficiently large to be readily passed over and around the annulus 20. The inner face of the annulus or ring contact portion 27 is equipped with a plurality of flexible fingers 28 arranged in a number of radial sets as indicated in Fig. 3. These fingers extend radially from the electrode, one finger 28 overhanging the other, as clearly shown in the drawings, with the fingers adjacent the central bore extending towards the line of weld. The body of the electrode is provided with a number of spaced apart apertures 29 which are suitably inclined to afford an unobstructed view of the line of contact between the sleeve and plate during the welding operation. In practical use, the transformer may be mounted upon a crane which can be moved into any desired position along the plates 1 and 3, and the electrodes 25, 26, may either be directly attached to the end of the crane arm or upon any suitable frame device carried thereby. None of these details however form a part of the present invention, it being sufficient to note that the method of either mounting the transformer or affixing the electrodes 25 and 26, or both, is of such a nature that the faces of the electrodes may be readily brought into position to abut the plate 1 and the head 13, respectively, in the manner illustrated in Fig. 1 of the drawings.

The welding process is carried out as follows: A number of the units formed by the plug 11, sleeve 2, segmental members 17 and the annulus 20 are arranged in position within spaced apart apertures 4 in the manner above described. The electrodes 25, 26, are then moved into position so that the flexible fingers 28 contact the plate 1 with the electrode 26 abutting the head 13, it being understood that until the fingers 28 actually contact the plate 1 they remain in a position so as to provide a space therebetween sufficiently large to pass around the sleeve 20. As soon as the fingers contact the plate 1, due to the pressure applied either by means of the crane arm to which the electrodes 25 and 26 are attached or by any other instrumentality upon which the said electrodes are mounted, the fingers are flexed and consequently creep radially inwardly towards the line of weld, finally assuming the position shown in Fig. 1. The fingers 28 therefore assure good electrical contact throughout the entire region surrounding the line of weld regardless of inequalities or variations in the relative positions of the several parts. Current is then passed through the electrode 25—27 to the plate 1, traversing the contacting portions between the outer surface of the sleeve 2 and the reamed out face 4′ of the aperture 4, the circuit being completed through the plug 11 and the electrode 26. Due to the fact that only certain portions of the sleeve 2 actually touch the plate 1 when first applied on account of irregularities in the parts, during the initial steps of the welding operation these contacting portions will first become highly heated. In order to insure a perfect weld throughout the entire beveled portion 4′, as the line of weld gradually becomes heated, the wing nut 16 is turned in the proper direction to gradually force the sleeve 2 into firm contact with the plate 1. By maintaining this pressure between the sleeve and plate, the sleeve 2 is finally made to firmly contact every portion of the beveled face 4′, thus positively securing a perfect weld throughout its entire surface. The openings 29 are so disposed that the entire welding operation may be easily observed by the operator. The switches for controlling the current supply may be disposed at any suitable point and within easy access of the welder. After the welding operation has been completed, the electrodes 25 and 26 are removed in an obvious manner. The plug 11, after previous removal of the wing nut 16, may be unthreaded from the segmental portions 17, and the annulus 20 removed so as to release the members 17, thus leaving the welded sleeve attached to the plate 1, as indicated in Fig. 5 of the drawings.

Referring to Fig. 4 of the drawings, 30 designates a hollow plug which is adapted to fit within the interior of the sleeve 2. Extending from the outer portion of the plug 30 are a plurality of lugs 31 to which segmental fingers 32 are pivoted as at 33, the fingers 32 being adapted to contact the exterior of the sleeve 2 when the parts are in assembled operative relation. A rod 34 extends through the hollow bore of the plug 30 and is provided at its outer portion with the enlarged exteriorly threaded part 35 and at its extreme outer end with the head 36 corresponding to the head 13 of the previously described embodiment. Engaging the threaded portion 35 is a nut 37 which presses against a flanged bell-shaped member 38 extending inwardly therefrom thus causing to embrace and contact the exterior of the segmental fingers 32. The rod 34 projects inwardly a sufficient distance to bridge the space between the apertures 4 and 8 similar to the extension 14 in the form first described. In order to prevent the flow of current through the rod 34 to the plate 3, the rod is formed of two parts, the inner part 34′ being insulated by the interposition of any suitable insulating material indicated at 39. In order to form a suitable space for the reception of the insulating material which in the present instance is preferably of such a nature as to have a binding effect between the parts, the portion 34′ is hollowed out for the reception of the reduced portion 34″ of the main body 34, thus leaving a space between the parts 34′ and 34″, which may be filled with an insulating binder such as bakelite, and in order to increase the bond a number of offset portions such as shown at 40$^a$ are formed at suitably spaced intervals. It is evident that with the construction described, the parts will not only be insulated from each other but rigidly connected.

The operation of this modified form will be obvious from that previously set forth in detail in connection with the previously described form. The parts are first assembled with the sleeve interposed between the hollow plug 30 and the segmental fingers 32, the rod 34 inserted in place, and the nut 37 screwed inwardly so as to cause the fingers 32 to firmly grip the sleeve 2, in the manner shown in Fig. 4. The parts thus assembled are applied as a unit with the inner end 34' of the rod 34 projecting within aperture 8 of the plate 3 so as to set the sleeve 2 in the proper angular position. The electrodes 25 and 26 are then brought into operative position and the current applied as previously set forth. In this modification, however, the wing nut 16 and the insulating bushing 15 are dispensed with, and the sleeve 2 is gradually forced into firm contact with the beveled face 4' during the welding operation by gradually turning the nut 37 upon the threaded portion 35 as the welding process proceeds. It is noted that with the construction shown in Fig. 4 the threaded engagement between the nut 37 and the part 35 is such that a turning of the nut, as described, will tend to cause the nut to travel inwardly towards the plate 1, and in ordinary practice the resistance offered by the electrode 26 and its mounting will be sufficient to prevent backing up of the head 36.

In some instances it has been found that it is preferable not to depend upon the resistance or pressure of the electrode mounting to prevent backing up of the head 36, it being desirable to use some means for positively locking the rod 34 against relative longitudinal movement with respect to the plate. In which case, a nut similar to the nut 16 may be applied to the portion 34' projecting beyond the aperture 8, or as an alternative means of preventing movement of the rod 34 with respect to the plate, the mechanism shown in Figs. 6 and 7 may be utilized. This mechanism comprises a pair of pivoted dogs 40, 40' provided at their outer ends with tips 40'' of insulating material, the said dogs being pivoted within suitably formed recesses in the body of the rod 41, and connected by links 42, 42' to a head 43 attached at one end of a stem 44 which extends through a longitudinal bore 45 of the rod and having attached at its inner end an actuating handle 46. In this construction, the inner extremity 47 of the rod 41 is reduced in cross section and is projected through an insulating bushing 48 corresponding to the insulating bushing 15 in the previously described form. In operation, after the rod 41 has been projected through the apertures in the plates 1 and 3, the stem 44 is forced in a direction towards the left, as viewed in Fig. 6, so as to project the dogs 40, 40' outwardly into abutting relation to the plate 1 to prevent the withdrawal of the rod. It is thus seen that with the parts thus positioned any turning of the nut 37 will positively force the sleeve into contact with the plate 1 without danger of the rod backing away from the plate. In order to remove the rod 41, after the sleeve 2 has been welded in place, it is merely necessary to pull the stem 44 towards the right so as to project the dogs 40, 40' within the recesses in which they are pivoted, after which the rod 41 may be withdrawn in an obvious manner.

It is thus seen that the invention provides a simple and durable construction which may be used generally for welding sleeves or similarly shaped portions to plates, one which will not readily get out of order, which functions to automatically set the sleeve in proper angular position with respect to the plates during application of the parts into position for welding, which positively forces the sleeve into firm contact with the plate thus assuring a substantially perfect weld, and one in which the welding operation may be observed by the operator throughout the entire process.

We claim:

1. A device for electrically welding sleeves to one of a pair of spaced apart plates comprising a plug adapted to fit within the sleeve whereby to position the same in the aperture of the plate to which it is to be welded, a rod extending inwardly from the plug and adapted to be projected through an aperture in the remaining plate for setting the angular position of the sleeve within the first named plate, means for supplying current to the plate adjacent the line of contact between the sleeve and plate, and means for conducting the current from the plug to complete the circuit.

2. A device for electrically welding sleeves to plates comprising a plug adapted to fit within the interior of the sleeve whereby to position the same in the aperture of the plate to which it is to be welded, a rod projecting inwardly from said plug for setting the angular position of said sleeve, means for supplying current to the plate adjacent the line of contact between the sleeve and plate, and means for conducting current from the plug to complete the circuit.

3. A device for electrically welding sleeves to plates comprising a plug adapted to fit within the sleeve, means embracing the sleeve for binding it to the plug, a ring electrode for supplying current adjacent the line of weld between the sleeve and plate, and means for conducting the current from the plug to complete the circuit.

4. A device for electrically welding sleeves to plates comprising a plug adapted to fit within the sleeve whereby to position the same in the aperture of the plate to which it is to be welded, means for locking the sleeve to the plug to form an independent unit therewith, means associated with the plug for regulating the pressure between the sleeve and plate, means for supplying current to the plate adjacent the line of contact between the sleeve and plate, and means for conducting the current from the plug to complete the circuit.

5. A device for electrically welding sleeves to plates comprising a plug adapted to fit within the sleeve, members associated with the plug embracing the sleeve for binding the sleeve to the plug, a rod projecting inwardly from the plug for setting the angular position of the sleeve within the aperture of the plate to which it is to be welded, a ring electrode for supplying current adjacent the line of weld between the sleeve and plate, and an electrode for conducting the current from the plug to complete the circuit.

6. A device for electrically welding sleeves to plates comprising a plug adapted to fit within the sleeve, segmental members associated with the plug embracing the sleeve for binding the sleeve to the plug, a rod projecting inwardly from the plug for setting the angular position of the sleeve within the aperture of the plate to which it is to be welded, a ring electrode provided with a plurality of flexible fingers projecting therefrom adapted to contact the plate throughout the entire region of the line of weld for supplying current thereto, and means for conducting the current from the plug to complete the circuit.

7. A device for electrically welding sleeves to plates comprising a plug adapted to fit within the sleeve, segmental members associated with the plug embracing the sleeve for binding the sleeve to the plug, the plug, sleeve and segmental members forming a self-sustaining unit when in assembled relation, a rod projecting inwardly from the plug for setting the angular position of the sleeve within the aperture of the plate to which it is to be welded, means associated with the plug for regulating the pressure between the sleeve and plate, a ring electrode provided with a plurality of flexible fingers projecting therefrom adapted to contact the plate throughout the entire region adjacent the line of weld for supplying current thereto, the said fingers extending radially towards the sleeve whereby pressure upon the ring will cause the tips of the fingers to approach the line of weld, and means for conducting the current from the plug to complete the circuit.

8. A device for electrically welding sleeves within an aperture of one of a pair of spaced apart plates comprising a plug fitting within the interior of the sleeve for positioning the sleeve against the plate to which it is to be welded, a rod extending inwardly from the plug and adapted to be projected through an aperture in the remaining plate for setting the angular position of the sleeve within the first named plate, means for preventing the passage of current from the rod to the second named plate, means for regulating the pressure between the sleeve and plate, a ring electrode provided with a plurality of flexible fingers projecting therefrom adapted to contact the plate throughout the entire region surrounding the line of weld for supplying current thereto, and an electrode for conducting the current from the plug to complete the circuit.

In testimony whereof, we hereunto sign our names.

GROVER R. GREENSLADE.
EUGENE G. FLANNERY.

Witness:
EDWIN O. JOHNS.